Figure 1:
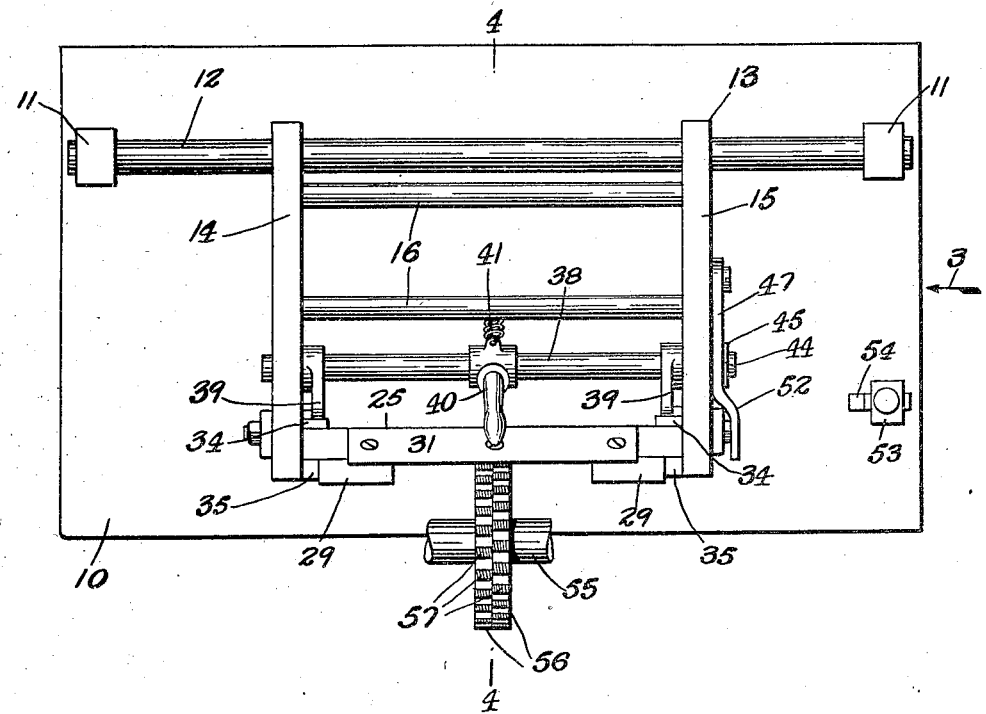

Jan. 29, 1924. 1,481,803
A. KÖNIG
APPARATUS FOR MAKING SAW BLADES
Original Filed Aug. 28, 1918  2 Sheets-Sheet 1

Inventor
Adolf König
By his Attorneys

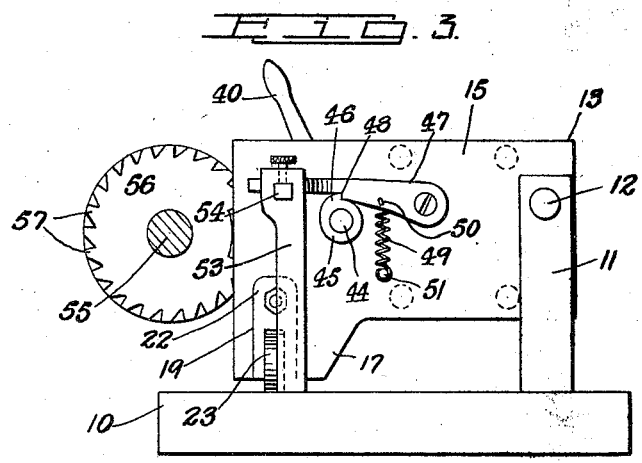
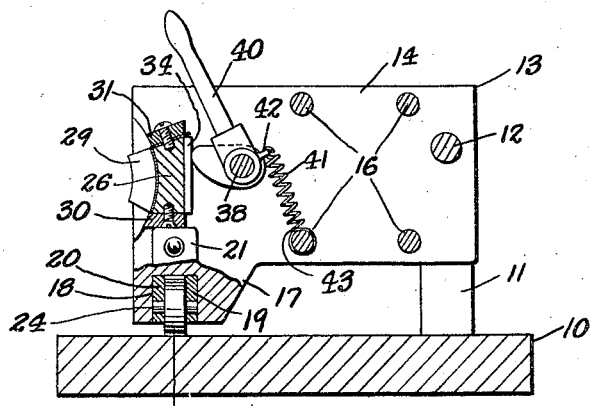
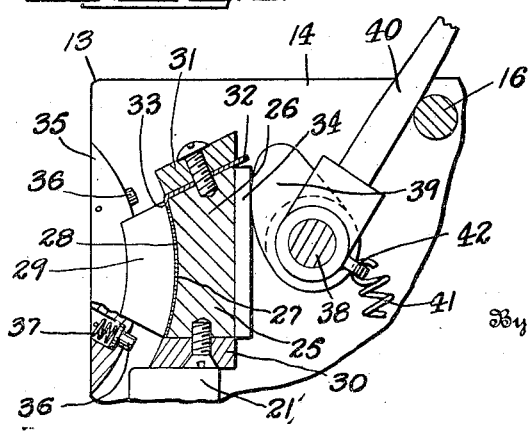

Patented Jan. 29, 1924.

1,481,803

UNITED STATES PATENT OFFICE.

ADOLF KÖNIG, OF HOBOKEN, NEW JERSEY, ASSIGNOR TO HANS K. LORENTZEN, OF NEW YORK, N. Y.

APPARATUS FOR MAKING SAW BLADES.

Application filed August 28, 1918, Serial No. 251,762. Renewed June 23, 1923.

*To all whom it may concern:*

Be it known that I, ADOLF KÖNIG, a citizen of the United States, and residing at Hoboken, in the county of Hudson and State of New Jersey, have invented certain new and useful Improvements in Apparatus for Making Saw Blades, of which the following is a specification, such as will enable those skilled in the art to which it appertains to make and use the same.

This invention relates to apparatus for making saw blades, and the object thereof is to provide apparatus of this class which may be used in connection with ordinary milling machines, lathes, planing machines or other machines or apparatus of a similar class or classes; a further object being to provide an apparatus of the class specified which is particularly designed for use in manufacturing what are known as jewelers' saws or saw blades, and which may also be used in manufacturing hack saws and the like; and a still further object being to provide an apparatus of the class specified with means whereby the workpiece supporting member may be quickly attached to and detached from the apparatus and locked against displacement in its attached position; and with these and other objects in view the invention consists in an improvement in apparatus of the class and for the purpose specified, constructed as hereinafter described and claimed.

The invention described and claimed herein is an improvement on that described and claimed in a prior application filed by me June 29, 1918, Serial No. 242,550, and is fully disclosed in the following specification, of which the accompanying drawings form a part, in which the separate parts of my improvement are designated by suitable reference characters in each of the views, and in which:—

Figure 2:
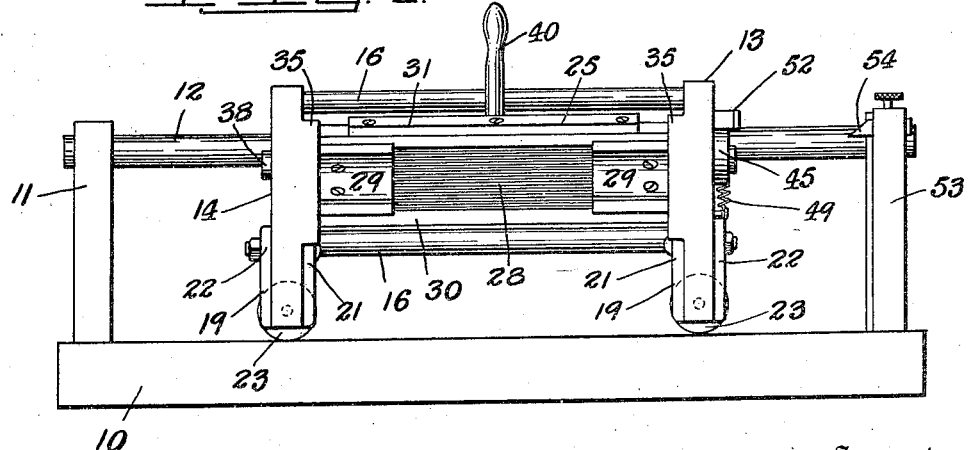

Fig. 1 is a plan view of my apparatus and indicating the method of its use;

Fig. 2 a front view of the construction as shown in Fig. 1 with parts shown in Fig. 1 omitted;

Fig. 3 a view looking in the direction of the arrow 3 of Fig. 1;

Fig. 4 a partial section on the line 4—4 of Fig. 1; and,

Fig. 5 a view similar to Fig. 4 showing only a part of the construction and showing the same on an enlarged scale.

In the drawing I have shown at 10 a suitable rectangular base or supporting table to the top face of which are secured, adjacent to two of the corners of said base, upwardly directed bearings 11 in which is mounted a shaft 12, which extends longitudinally of the back portion of the base 10.

Mounted on and movable longitudinally of the shaft 12 is a frame 13, comprising parallel side members 14 and 15 connected by four longitudinal rods 16, as clearly shown in Fig. 4. The forwardly directed portions of the side members 14 and 15 of the frame 13 are each provided with downwardly directed extensions 17, the bottom faces of which are recessed as shown at 18, and mounted in said recesses are U-shaped roller supporting devices 19, comprising cross head portions 20 which fit in the recesses 18 and upwardly directed inner flanges 21 and outer flanges 22, and rollers 23 are mounted in the cross head portions and held therein by transverse pins 24 on which said rollers rotate. The rollers 23 serve to support the front end portion of the frame 13 in its movement on the shaft 12 as will be readily understood.

The inner upwardly directed flanges 21 of the roller supporting devices 19 serve to form a stop to limit the downward movement of the workpiece supporting member 25 employed in connection with the frame 13, and said workpiece supporting member comprises a body or stock portion 26 of elongated form, the front face of which is slightly concavo-convex as shown at 27, and a plurality of saw blade blanks 28 are adapted to be supported in said concavo-convex face 27 by arc-shaped blocks 29 at the opposite end portions of the body or stock 26, and by a bottom strip 30 and top strip 31, both of which are secured to the body or stock 26, and also by a thin strip or sheet 32 having a downwardly directed flange 33, which strip is placed between the strip 31 and the top face of the body or stock 26. This construction of the workpiece supporting member 25 may be of the same form and construction as the corresponding member described in my prior application hereinbefore referred to, but with my improved apparatus I preferably provide the back of the body or stock 26 with a straight or flat face, and secured to the opposite end portions thereof are hardened strips or plates 34.

The front end portions of the parallel sides 14 and 15 of the frame 13 are provided on their inner faces with inwardly directed arc-shaped segments 35, one of which is clearly shown in Fig. 5 of the drawing, and mounted in said segments adjacent to the top and bottom thereof are knobs or buttons 36 normally extended by springs 37, and these spring-actuated knobs or buttons serve to release the workpiece supporting member 25 from the arc-shaped segment 35, as hereinafter described.

A shaft 38 is mounted centrally of the front end portion of the frame 13 and between the side members 14 and 15 thereof, and secured to the end portions of said shaft within the side members 14 and 15 of the frame are cam devices 39 which are adapted to operate upon the hardened plates 34 on the work-piece supporting member 25, as clearly shown in Figs. 1, 4 and 5. An operating lever 40 is secured centrally of the shaft 38 and a tensional device 41 is connected with said lever at 42 and with one of the rods 16 as shown at 43, and said spring serves to normally hold the lever 40 and cam devices 39 in the position shown in Fig. 5.

The shaft 38 extends outwardly through the side member 15 of the frame 13 as shown at 44, and a sleeve 45 provided with a raised portion 46 is mounted on said end of the shaft as shown in Fig. 3 of the drawing. Pivoted to the outer face of the side member 15 of the frame 13 is a lever 47 having a notch 48 adapted to cooperate with the raised portion 46 on the sleeve 45 and serves to hold the lever 40 and cam devices 39 in the position shown in Figs. 1, 3 and 4 of the drawing against the tension of the spring 41.

A spiral spring 49 is secured to the lever 47 at 50 and to a pin 51 secured to the side member 15, and this spring serves to normally hold the lever in a depressed position. The free end portion of said lever 47 is of bayonet form as shown at 52, and a vertical keeper 53 is secured to one end portion of the base 10 and in the upper end portion of which is mounted an inwardly directed beveled finger 54 which is adapted to cooperate with the bayonet end portion 52 of the lever 47 to raise the same and release the sleeve 45 and permit the lever 40 and cam members 39 to move from the position shown in Figs. 1, 3 and 4 into that shown in Fig. 5.

In Figs. 1 and 3 of the drawing, I have shown at 55, a shaft of a milling or other machine, or a shaft connected with the tool shaft of such machine, and on which is mounted two disk cutters 56, the peripheries of which are provided at intervals with cutting faces 57 of thread-like form and, in the practice of my invention, or in the use of the cutters, I preferably set said cutters in the position shown in Fig. 1, or with the cutting faces of one cutter slightly in advance of the corresponding faces of the other cutter, and the object of this is to produce a sharp tooth or sharp teeth in the saw blades.

The operation of the apparatus will be readily understood from the foregoing description when taken in connection with the accompanying drawings and the following statement. The frame 13 with the parts connected therewith is first moved to the left on the shaft 12 and base 10, or to such position as to bring the cutters 56 at the right end portion of the saw blade blanks 28 supported in the workpiece supporting member 25, which member is placed in position when the lever 40 and cam devices 39 are in the position shown in Fig. 5. and moved into the position shown in Fig. 4 by drawing the lever 40 forwardly which moves the cam devices 39 forwardly and the workpiece supporting member or the front face thereof depresses the knobs or buttons 36, and this forward movement is continued until the notch 48 in the lever 47 receives the raised portion 46 on the sleeve 45, which serves to lock the workpiece in the position shown in Fig. 4 as hereinbefore stated. The shaft 55 is then rotated by the machinery, or apparatus with which it is connected and the cutters 56 correspondingly rotated, which operation cuts the desired teeth in the blanks 28 and the operation of the cutters will move the frame 13 to the right on the shaft 12 and rollers 23, and when said cutters reach the extreme left of the blanks 28 the finger 54 will strike the bayonet end portion 52 of the lever 47 and raise it out of engagement with the sleeve 45 and thus release the lever 40 and cam devices 39 and the spring operated knobs or buttons 36 will then move the workpiece supporting member backwardly out of engagement with the cutters 56, and this backward movement of the workpiece supporting member 25 facilitates its removal from the apparatus and the substitution therefor of another workpiece supporting member, having saw blade blanks therein, and by moving the frame 13 to the left the above operation may be repeated.

Having fully described my invention, what I claim as new and desire to secure by Letters Patent, is:—

1. In an apparatus of the class described, a base, a shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, and means for locking said member in position.

2. In an apparatus of the class described, a base, a shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, means for locking said member in position, and means for releasing said locking means.

3. In an apparatus of the class described, a base, a shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, means for locking said member in position, means for releasing said locking means, and tensionally operated means for moving said member backwardly in said frame when released.

4. In an apparatus of the class described, a base, a main shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, a shaft mounted centrally of the front end portion of the frame and inwardly of said member, cam devices secured to said shaft and cooperating with said member to hold it in proper position, a hand-operated lever secured to said shaft, tensional means for normally holding said cam devices in inoperative position, and means for locking said devices in their operative position.

5. In an apparatus of the class described, a base, a main shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, a shaft mounted centrally of the front end portion of the frame and inwardly of said member, cam devices mounted on the opposite end portions of said shaft and within the frame and cooperating with said member, means on said shaft for moving said cam devices into operative position, tensional means for moving the same into inoperative position and a lock mechanism mounted on and adapted to cooperate with one end portion of said shaft outwardly of one side of the frame to lock the cam devices in their operative position against said tensional means.

6. In an apparatus of the class described, a base, a main shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, a shaft mounted centrally of the front end portion of the frame and inwardly of said member, cam devices mounted on the opposite end portions of said shaft and within the frame and cooperating with said member, means on said shaft for moving said cam devices into operative position, tensional means for moving the same into inoperative position, a lock mechanism mounted on and adapted to cooperate with one end portion of said shaft outwardly of one side of the frame to lock the cam devices in their operative position against said tensional means, and means for operating said lock mechanism when the frame reaches a predetermined position in its movement on the main shaft to release said cam devices from said member.

7. In an apparatus of the class described, a base, a main shaft mounted longitudinally of and above the rear end portion of said base, a frame mounted on said shaft and movable longitudinally thereof, rollers for supporting the front end portion of said frame in its movement over the base, a workpiece supporting member detachably mounted in the front end portion of the frame, a shaft mounted centrally of the front end portion of the frame and inwardly of said member, cam devices mounted on the opposite end portions of said shaft and within the frame and cooperating with said member, means on said shaft for moving said cam devices into operative position, tensional means for moving the same into inoperative position, a lock mechanism mounted on and adapted to cooperate with one end portion of said shaft outwardly of one side of the frame to lock the cam devices in their operative position against said tensional means, means for operating said lock mechanism when the same reaches a predetermined position in its movement on the main shaft to release said cam devices from said member, and spring-operated devices for moving said member backwardly in the frame when released by said cam devices.

8. In an apparatus of the class described, a frame composed of parallel side members, a workpiece supporting member detachably mounted in said frame between said side members, the inner faces of the side members of the frame being provided with arc-shaped segments, a shaft mounted in the side members of said frame rearwardly of said segments, spring-operated devices mounted in said arc-shaped segments and adapted to move said member backwardly, cam devices mounted on the opposite end portions of said shaft, means for moving said cam devices forwardly to move said member into engagement with said segments against the tension of said spring-operated devices, and means for locking said cam devices in their operative position.

9. In an apparatus of the class described, a frame composed of parallel side members, a workpiece supporting member detachably mounted in said frame between said side members, the inner faces of the side members of the frame being provided with arc-shaped segments, a shaft mounted in the side members of said frame rearwardly of said segments, spring-operated devices mounted in said arc-shaped segments and adapted to move said member backwardly, cam devices mounted on the opposite end portions of said shaft, means for moving said cam devices forwardly to move said member into engagement with said segments against the tension of said spring-operated devices, means for locking said cam devices in their operative position, and means for releasing the locking means of said cam devices to permit said spring-operated devices in said segments to move said member backwardly.

10. In an apparatus of the class described, a frame composed of parallel side members, a workpiece supporting member detachably mounted in said frame between said side members, the inner faces of the side members of the frame being provided with arc-shaped segments, a shaft mounted in the side members of said frame rearwardly of said segments, spring-operated devices mounted in said arc-shaped segments and adapted to move said member backwardly, cam devices mounted on the opposite end portions of said shaft, means for moving said cam devices forwardly to move said member into engagement with said segments against the tension of said spring-operated devices, means for locking said cam devices in their operative position, and tensional means for moving said cam devices into inoperative position.

11. In an apparatus of the class described, a base, a frame mounted for movement longitudinally of the base, a workpiece supporting member detachably associated with the frame, and means for locking said member in position within the frame.

12. In an apparatus of the class described, a base, a frame mounted for movement longitudinally of the base, a workpiece supporting member associated with the frame, manually operated means for shifting the member into operative position, and a resilient means for moving the member into inoperative position upon release of the manually operated means.

13. A metal working machine comprising a movable table having associated therewith a work support, in combination with a cutter having on its periphery a plurality of separated series of diagonally arranged cutting teeth, the teeth of one series being slightly in advance of the teeth of the adjacent series, said teeth adapted in their action upon the work to progressively advance the table transversely of the cutter.

In testimony that I claim the foregoing as my invention I have signed my name in presence of the subscribing witnesses this 26th day August, 1918.

ADOLF KÖNIG.

Witnesses:
C. E. MULREANY,
H. E. THOMPSON.